Aug. 25, 1936.                    J. B. STRAUSS                    2,052,116
                                 HYDRAULIC SCALE
                               Filed Oct. 23, 1933

INVENTOR
Joseph B. Strauss
BY
ATTORNEY

Patented Aug. 25, 1936

2,052,116

UNITED STATES PATENT OFFICE 2,052,116

HYDRAULIC SCALE

Joseph B. Strauss, San Francisco, Calif.

Application October 23, 1933, Serial No. 694,734

2 Claims. (Cl. 265—47)

This invention relates to improvements in weighing apparatus and has particular reference to scales for weighing heavy loads.

The principal object of the invention is to provide means for accurately weighing a load irrespective of its distribution upon the weighing platform.

A further object is to provide means for transferring the weight of a load to a visible indicator at a remote point, without the employment of a system of levers, etc.

A further object is to provide hydraulic means for supporting the weighing platform.

Other objects and advantages will be apparent during the course of the following description.

Figure 1:
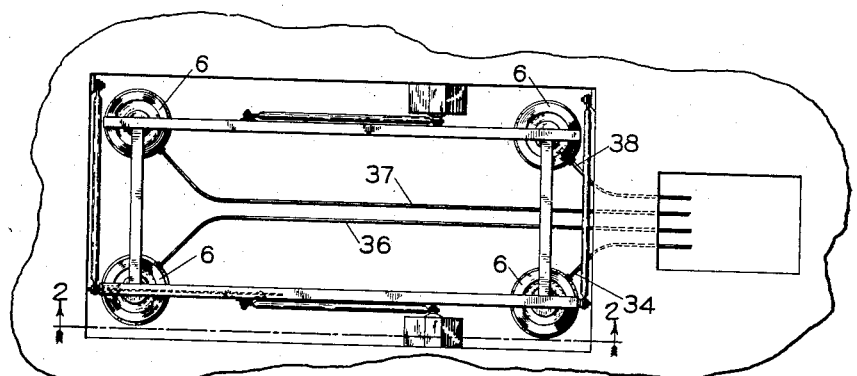

In the accompanying drawing forming a part of this specification and in which like numerals are employed to designate like parts throughout the same, Fig. 1 is a top plan view of a platform support showing the employment of a plurality of hydraulic supporting capsules.

Figures 3, 4:
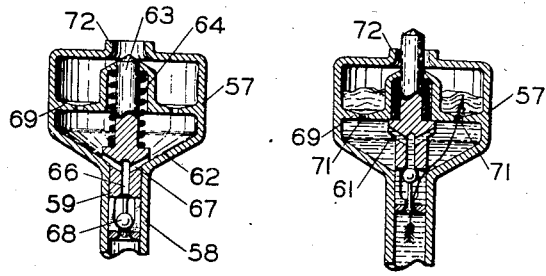
Figure 5:
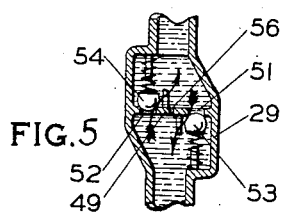
Figure 2:
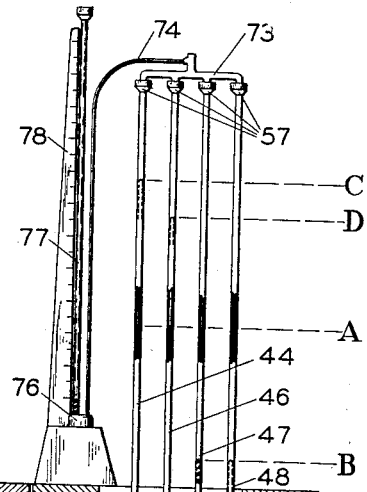
Figure 6:
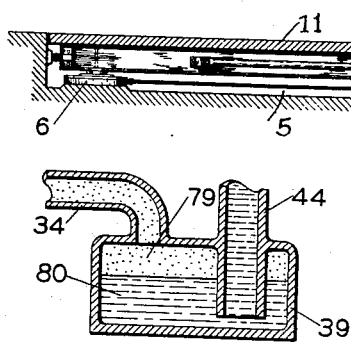

Fig. 2 is a cross sectional view on the line 2—2 of Fig. 1, and showing an indicating mechanism in conjunction therewith, Fig. 3 is a cross sectional view of one of the escape valves, Fig. 4 is a view similar to Fig. 3, showing the escape valve in operation, Fig. 5 is a cross sectional view of a surge valve, and Fig. 6 is a cross sectional view of a transition chamber.

Weighing devices usually consist of a platform supported upon a series of levers, which levers in turn rest upon knife-edge bearings. These levers are in turn inter-connected and through a further system of levers any movement of the inter-connected point is transferred to a remotely positioned indicating dial or beam. As a result of this construction, when a load moves onto the scale, which load is not evenly distributed, then a true registration of the weight upon the platform cannot be obtained. Applicant has, therefore, designed a weighing mechanism wherein a hydraulic capsule or capsules serve to support the platform and its load, and through peculiar arrangements, if a single capsule is employed all pressure is exerted downwardly upon the capsule, irrespective of the weight distribution upon the platform. If several capsules are employed, then unequal distribution of weight upon the platform will be transferred to the respective capsules and from the capsules to an indicator which sums up the total of the pressures exerted upon each of the capsules.

In Fig. 1 I have shown four capsules such as disclosed in my patent Serial No. 2,024,400 issued December 17, 1935, which are located in a pit 5 (see Fig. 2). These capsules are connected by pipes 34, 36, 37 and 38 to transition chambers 39, 41, 42 and 43, respectively. These transition chambers form traps to prevent the flow of the oil from the pipes 34 to 38 from going up the tubes 44 to 48 and also act as a mercury reservoir. The transition chamber 39 is connected to a pipe 44, the transition chamber 41 to a pipe 46, the transition chamber 42 to a pipe 47 and the transition chamber 43 to a pipe 48. Interposed in each of these pipes 44, 46, 47 and 48, and preferably located adjacent the transition chamber, is a surge valve 29 (see Fig. 5). This surge valve has an enlarged chamber in which is formed a partition 49 having ports 51 and 52, closed by spring pressed balls 53 and 54, respectively. A bleeder opening 56 also extends through the partition 49. The upper end of each of the pipes 44, 46, 47 and 48, is connected to an escape valve body 57 (see Figs. 3 and 4). This escape valve body consists of a stem portion 58, in which is slidably mounted a valve 59 provided with a seat 61 capable of moving into engagement with the sloping surface 62 of the valve body. This valve 59 has a guide stem 63 which is surrounded by a spring 64, the action of which is obvious. Mounted within the valve 59 is a port 66, which connects to radial ports 67. A ball 68 is held in a cage on the bottom of the valve 59. A partition 69 divides the valve body into two chambers and ports 71 connect these two chambers. A tubular extension 72 is formed upon the top of the valve body and permits the valve to be attached to a pipe line, as for instance, the manifold 73 of Fig. 2 or the same may be left open for the escape of air.

Referring again to Fig. 2, I have shown the manifold 73 connected by a pipe 74 to a transition chamber 76, which in turn is connected to a gauge tube 77 adjacent which is a scale 78. An escape valve is also attached to the upper end of this tube 77. The construction of the transition chamber is best illustrated in Fig. 6, where it will be noted that one of the pipes, for instance, the pipe 34, conducts a fluid 79 against the surface of a fluid 80. This fluid 80, in turn, communicates with the fluid in the pipe 44. Fluid in the pipe 44 is preferably mercury and fluid in the pipe 34 is preferably a light oil.

The operation of my apparatus is as follows:—

Assuming now that a load has been placed upon the platform 11, the pressure in each capsule will be transferred through the pipes 34, 36, 37 and 38, to the respective transition chambers 39, 41, 42 and 43, and from thence the pressure will be transferred to the mercury in the tubes 44, 46, 47 and 48, respectively. We will now assume that the load is identical upon each of the capsules, in which event all of the mercury columns in the tubes will rise equally, or, for instance, to the level A. As the tubes are filled with oil above the mercury, as well as the tube 74 down to the transition chamber 76, it will be apparent that the rising of the mercury in the pipes to the point A will have forced this oil before the rising columns into the manifold 73 thence through the pipe 74 to the transition chamber 76, which corresponds to the transition chamber (Fig. 6). This pressure in the transition chamber 76 will force the mercury in the gauge tube 77 to rise and indicate upon the scale 78 the weight of the load. Now assuming that the weight upon the platform is unevenly distributed and the capsules to the top of the drawing have the least load, and the capsules to the bottom of the drawing have the greatest load, and also that the capsules to the bottom of the drawing have their load unequally divided, the result will be that the pipes 37 and 38 will not transmit as great a pressure as the pipes 36 and 37. Consequently the mercury in the pipes 47 and 48 will only rise to the point B, while the mercury in the pipes 44 and 46 will rise to the points C and D. As all these pipes are connected to the common manifold 73, it will be apparent that there will be a transfer of pressure between the various pipes until an equalizing balance occurs. This equalized pressure will be transferred, as before mentioned, through the pipe 74 to the indicating tube 77. The escape valves 57 are for the purpose of preventing any mercury from escaping from its respective tube. The construction of the valve is such that the oil will pass upwardly through the valve when it is in the position of Fig. 3, by passing around the ball 68, through port 66 and passages 67. As soon as the mercury rises in the tube where it will enter the valve, the ball 68 will float upon the mercury and assume the position of Fig. 4. A considerable pressure will be required to force the spring 64 to the position of this figure, which pressure acts as a damper to stop the rapid flow of mercury and further only permits a very slow escape as indicated by the arrow of this figure. This escape will never exceed the capacity of the valve chambers. The surge valve, shown in Fig. 5, is to prevent rapid surges of mercury in either direction, but will permit a rapid enough flow to accommodate for the necessary variations.

The transition chambers, surge valves and relief valves perform a very definite function. The transition chamber 39, for instance, holds a sufficient quantity of mercury to fill the tube 44. The surge valve 29 prevents too rapid flow within the pipe 44 and the relief valve 57 permits the flow of fluid from the upper end of the tube 44 into the manifold 73. The reason for these connections to the pipe 44 is that by having the chambers 39 a light oil may be employed between the cells and the chamber, thus saving a great deal of expense. The surge valve 29 is merely a damper to prevent the violent fluctuations beyond the usefulness of the device. It is true that mercury and oil will move very fast and, therefore, when a truck moves onto the platform it might occur that one of the cells would be quickly compressed. Should that occur the mercury in the pipe 44 might, for instance, make a sudden start upwardly and due to its inertia might flow into the manifold 73 were it not for the relief valves which are so designed that they will stop this overflow which might occur between one tube and another.

It will thus be seen that I have devised a weighing apparatus which will quickly and accurately determine the weight of a load and transmit that weight to a distant point for observation or recording.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, the combination with a platform scale of a plurality of hydraulic cells positioned beneath the corners thereof, a plurality of chambers, a pipe leading from each of said cells into the top one of said sealed chambers, an outlet pipe extending into each of said chambers to a point adjacent the bottom thereof, mercury within said chambers and said last mentioned pipes, said last mentioned pipes extending upwardly, valves positioned on the upper extremity of said pipes, a manifold connected to said valves, each of said valves permitting a fluid other than mercury to pass therethrough and to seal and restrict the passage of mercury therethrough.

2. In a device of the character described, the combination with a platform scale of a plurality of hydraulic cells positioned beneath the corners thereof, a plurality of chambers, a pipe leading from each of said cells into the top one of said sealed chambers, an outlet pipe extending into each of said chambers to a point adjacent the bottom thereof, said last mentioned pipes extending upwardly, mercury within said chambers and the lower portion of said pipes, a surge valve positioned in said pipes, a light fluid positioned in said pipes above the mercury, the height of the mercury in said pipes being sufficient to place said cells under hydrostatic pressure, means for checking the flow of said mercury out of the top of said pipes and a manifold connecting said pipes whereby pressure in said manifold will indicate the combined pressure in said pipes.

JOSEPH B. STRAUSS.